United States Patent [19]
Scott

[11] 3,884,808
[45] May 20, 1975

[54] WEARABLE, SELF-REGENERATING DIALYSIS APPLIANCE

[75] Inventor: Robert D. Scott, Covina, Calif.

[73] Assignee: Research Development Systems, Inc., Pasadena, Calif.

[22] Filed: June 20, 1973

[21] Appl. No.: 371,950

[52] U.S. Cl. .............................. 210/109; 210/321
[51] Int. Cl. ............................................ B01d 31/00
[58] Field of Search ....... 210/22, 23, 321, 116, 206, 210/109

[56] References Cited
UNITED STATES PATENTS

| | | | |
|---|---|---|---|
| 3,388,803 | 6/1968 | Scott | 210/321 |
| 3,506,126 | 4/1970 | Serfass et al. | 210/321 X |
| 3,579,441 | 5/1971 | Brown | 210/23 |
| 3,669,880 | 6/1972 | Marantz et al. | 210/22 |
| 3,703,959 | 11/1972 | Raymond | 210/321 X |
| 3,799,873 | 3/1974 | Brown | 210/22 |

*Primary Examiner*—Frank A. Spear, Jr.
*Attorney, Agent, or Firm*—Louis J. Bachand

[57] ABSTRACT

A dialyzing appliance adapted to be worn as a belt by the user, having a dialysis fluid chamber and a dialysis membrane defining an extended blood flow passage for blood circulation through the fluid chamber in dialyzing relation with the dialysis fluid. To regenerate the dialysis fluid continuously during blood circulation a regeneration loop is provided, located in the belt buckle, having in series flow connection with the dialysis fluid chamber, a first regeneration chamber containing adsorptive material for impurity removal, a second regeneration chamber for reconstituting the fluid by incorporation of additional dialyzate, and a pump, suitably battery powered to circulate the dialysis fluid through the loop, countercurrently to blood flow through the membrane tubing.

9 Claims, 8 Drawing Figures

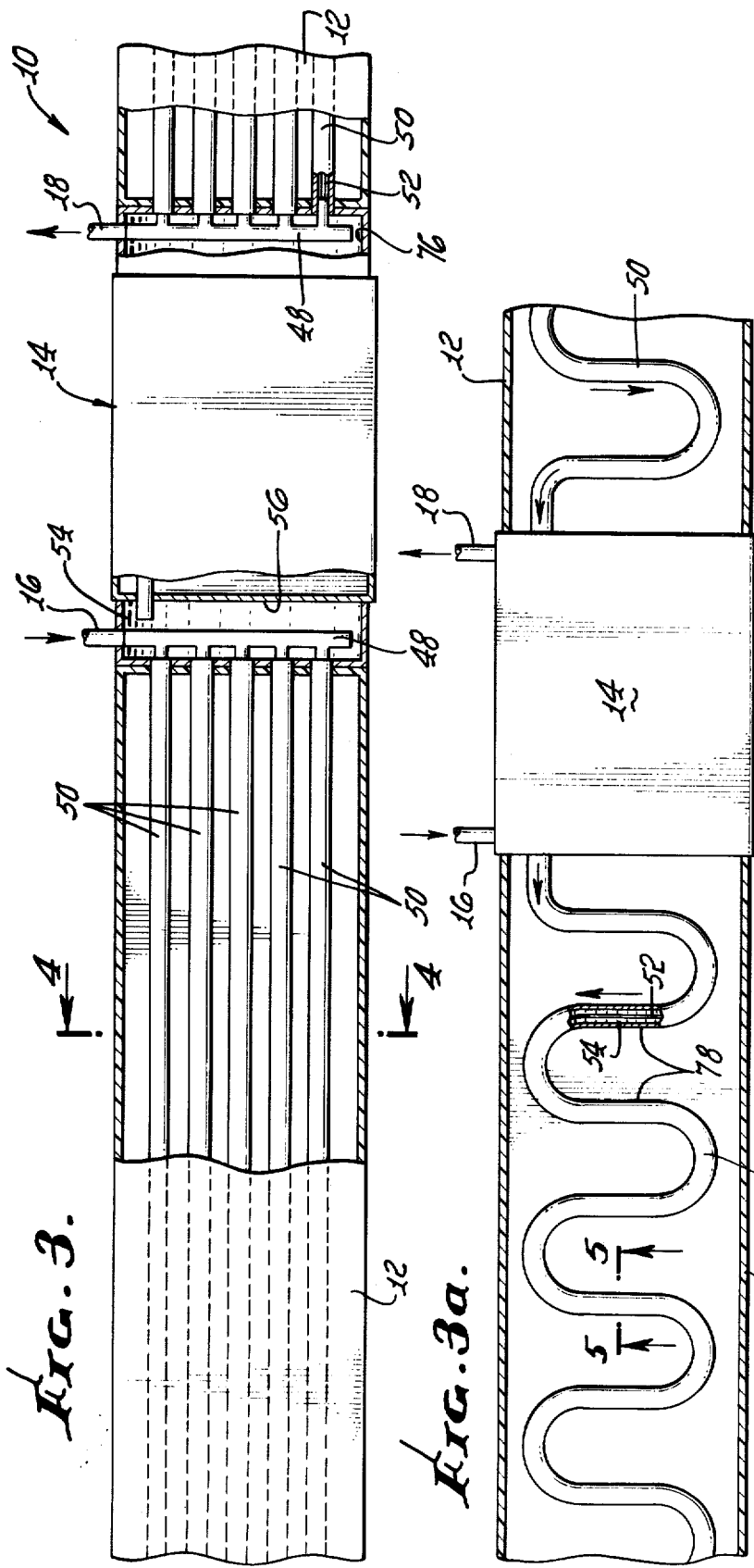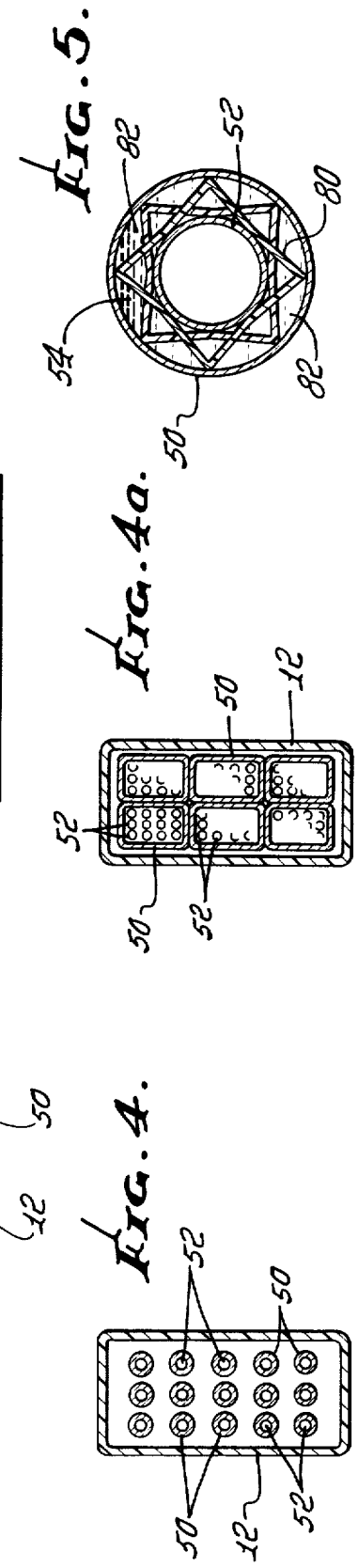

WEARABLE, SELF-REGENERATING DIALYSIS APPLIANCE

BACKGROUND OF THE INVENTION

This invention has to do with treatment of the blood by dialysis techniques to remove impurities or add medicaments and, more particularly is concerned with a wearable, self-regenerating dialysis appliance of compact, self-contained and inexpensive form adapted to be worn as a belt about a user's waist, and containing the means to purify the blood and purge and reconstitute itself for continuing use, all while being worn by a user going about his daily tasks.

Dialysis equipment for treating the blood, e.g., "artificial kidney" machines are known and while highly effective are extremely costly to own or operate. The dialysis principle upon which such devices operate is simple, however. The blood to be treated needs to be passed in dialyzing relation with a dialysis fluid. In my earlier patent, U.S. Pat. No. 3,388,803, issued June 18, 1968, a portable, wearable device was proposed for accomplishing many of the purposes of the larger, fixed installation machines. This device, however, lacked the capacity to self-regenerate and was dependent on a continuing new supply of dialysis fluid which was an inconvenience.

It is a major objective of this invention to provide a continuously self-regenerating dialysis appliance which is nonetheless wearable, e.g., as a belt about the user's waist.

It is a further objective to provide a blood treating appliance which is adapted to remove from or add to the blood dialyzable matter to either purify or condition the blood, on a metered controlled basis.

It is a still further object of the invention to incorporate the self-regeneration means of the appliance in a belt-buckle and the dialysis exchange chamber in the belt proper. Specific forms of dialysis exchange apparatus are also provided particularly adapted to the present appliance and providing countercurrent flow of blood and dialysis fluid.

SUMMARY OF THE INVENTION

These and other objectives of the invention are realized in a dialyzing appliance of the type adapted to be worn about the human body which comprises a dialyzing means including a dialysis fluid chamber and dialysis membrane defining an extended blood flow passage for blood circulation through the fluid chamber in dialyzing relation with the dialysis fluid, means to regenerate the dialysis fluid continuously during blood circulation comprising a regeneration loop having in series flow connection with the dialysis fluid chamber, a first regeneration chamber containing sorptive material adapted to remove from the dialyzing fluid impurities dialyzed from the blood and a second regeneration chamber containing make-up dialyzate solids for reconstituting the dialysis fluids, and means to pump the dialysis fluid continuously through the regeneration loop, and means to removably attach the appliance to the body of the wearer.

The appliance may further include a fluid tap arranged to drain fluid, e.g., water from the blood, from the regeneration loop to a waste receiver, suitably having a valve means controlling communication between the loop and the waste receiver responsive to fluid pressure in the loop.

As noted, the appliance is intended to be worn about a user's waist and for this purpose will include a belt portion adapted to encircle the waist of the user and a buckle portion for securing the belt in position. The belt portion being elongated is adapted to contain the dialysis apparatus, while the buckle portion is highly adapted to house the first and second regeneration chambers as well as the pump means and an electrically, e.g., battery driven motor to drive the pump.

The first regeneration chamber typically contains an adsorbent bed adapted to adsorb blood derived dialysis product, e.g., impurities such as uric acid, from the dialyzing fluid, while the second regeneration chamber typically contains particulate matter controllably soluble in the dialysis fluid to reconstitute the fluid in, e.g., salt content to maintain a desired concentration, relative to the blood being treated, the dialyzate solids in the chamber being subjected to controlled rate dissolution by dialyzing fluid passing through the second chamber, typically as a function of the dialyzate concentrations in the dialysis fluid. Where it is desired to add materials of low molecular weight to the blood, e.g., medications, the material is dissolved into the dialyzate fluid. It is then carried into the blood by virtue of its concentration difference across the membrane.

The dialysis chamber according to the invention is preferably a tube-within-a-conduit structure with the outer conduit carrying the dialysis fluid and the dialysis membrane tubing being located therein enclosed by the conduit and immersed in dialysis fluid, blood passing into the membrane tubing by suitable manifold means. In specific forms of the invention the conduit may enclose a plurality of very fine tubing lengths or a single, larger diameter tubing length, which may be supported in concentric disposition within the conduit by fluid passing, e.g., mesh support structure. The tubing-in-conduit arrangement may be arranged in plural parallel lengths within the belt or in sinuous single length form, the tubing and its enclosing conduit comprising reversely continuous and parallel extents within the belt.

BRIEF DESCRIPTION OF THE DRAWINGS

The invention will be further described as to illustrative embodiments thereof in connection with the attached drawings wherein:

FIG. 3 is a fragmentary view of the appliance, taken in elevation, and partly broken away to show the manifolded, parallel extents of tubing and conduit;

FIG. 3a is a view like FIG. 3, showing a variational, sinuous, form of tubing and conduit arrangement;

FIG. 4 is a view in transverse section of the belt, and tubing-in-conduit structure taken on line 4—4 in FIG. 3;

FIG. 4a is a view like FIG. 4 of a variational form of tubing-in-conduit structure;

FIG. 5 is a transverse section of another tubing-in-conduit structure taken on line 5—5 in FIG. 3a;

DESCRIPTION OF THE PREFERRED EMBODIMENTS

Figure 1:
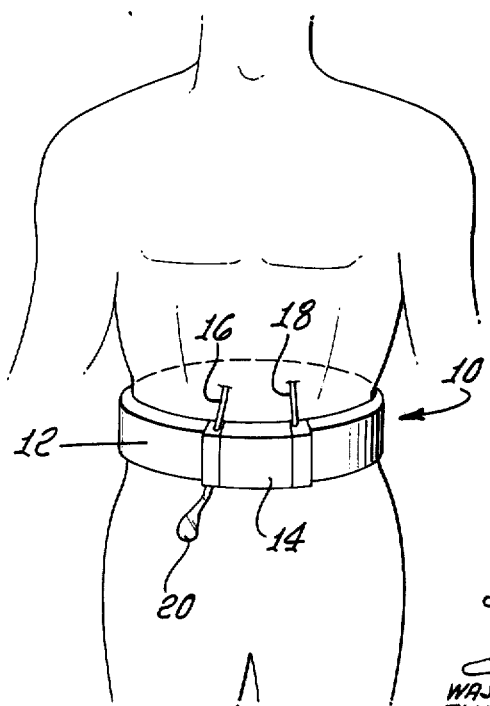
FIG. 1 is pictorial view of the dialysis appliance in the worn condition thereof.

As noted above, the appliance shown at 10 is designed and constructed in a form particularly adapted to wearing about the waist of a user and includes generally a belt portion 12 adapted to support the extended dialysis apparatus, a buckle portion 14 secured to the belt portion by conventional means and housing the regeneration chambers and pump means for the appliance, a blood inlet 16 leading from an artery, a blood outlet 18 leading to a vein, and a waste receiver 20 adapted to accumulate excess fluid from the dialysis apparatus. Typical dimensions for the buckle are depth 1.5 inch, height 3.5 inch and width 5.5 inch, a size readily adapted to wear on a human body while permitting normal body activity.

The art of blood dialysis is well known at this time and particular membrane materials and dialysis fluids useable in this art are also well known and do not per se constitute a novel part of this invention. The invention is more particularly concerned with the arrangement and use of such membrane and dialysis fluid materials in the novel structure and assembly defined herein. Thus typical dialysis membrane materials such as cellophane, sausage casings, or Cuprophan, of known suitable thicknesses, e.g., above 0.1 mil. and appropriate permeability for dialysis may be used. Similarly, for blood impurity removal aspects of the invention, known dialyzate materials dissolved in water to form the dialyzing fluid may be used, as is known. In this connection, the disclosure of my earlier patent U.S. Pat. No. 3,388,803 and the references cited therein is hereby incorporated by reference. Also see U.S. Pat. No. 3,667,612, to Leonard; U.S. Pat. No. 3,669,878 and 3,669,880 to Marantz, et al., additionally incorporated herein by reference. In the blood conditioning aspects of the invention, the liquid carrier for the conditioning dialyzate will be determined by the nature of the dialyzate used and in accordance with known compatibilities of such agent with liquids.

In general, the operation of the dialyzing fluid and dialysis membrane herein as in earlier devices for the purpose of dialyzing blood, is to grossly contain blood flow in an extended dialysis membrane, the blood being in dialyzing relation to a dialysis fluid through the membrane to effect through differences in concentration between the fluids of the various dissolved species a passage of such dissolved species tending to effect equality in their concentrations in the blood and dialyzate, e.g., uric acid will pass from the blood into the dialysis fluid and thus be purged from the blood analogously to the normal kidney function. Species of high molecular weight, e.g., albumin, or of particulate nature, e.g. erythrocytes, platelets, etc., cannot pass through the membrane because of their relatively large size in relation to the size of the membrane pores and are thus retained in the blood.

As the concentration in the dialysis fluid of uric acid, which may be taken as typical of impurities to be purged increases, the driving force for its transport is reduced and if the purification process is to go on, fresh dialysis fluid must be provided at the dialysis membrane. The invention herein is particularly concerned with a compact and facile effecting of this renewal of dialysis fluid for continuing effective dialytic separation of blood impurities.

Figure 6:
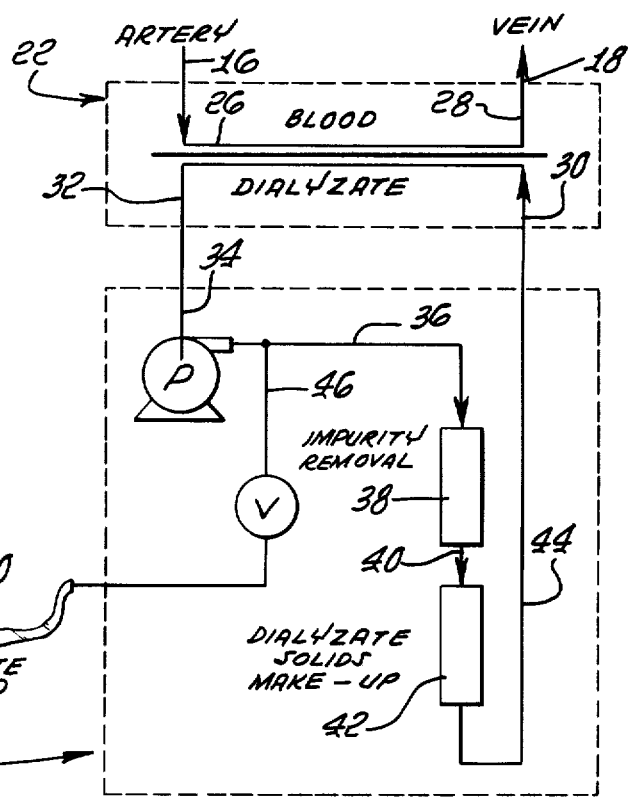
FIG. 6 is a schematic view depicting the relationship of the blood circulation path and countercurrent dialysis fluid recirculation loop according to the invention.

Referring to FIG. 6, the dialysis portion of the belt is depicted schematically at 22 and the buckle portion at 24. As shown, arterial blood is passed from inlet 16 in dialyzing relation to dialyzate at 26 and at 28 back to the venous system of the user under heart pumping. The dialyzate is passed countercurrently to the blood, entering the apparatus dialysis portion 22 at 30 and leaving at 32. The exchanged dialyzate enters the buckle portion 24 at 34 and is pumped by pump P along line 36 to a first regeneration chamber 38 where impurities are stripped, adsorbed, e.g., on a porous support such as activated carbon or other material having an affinity for impurities in the system, or otherwise removed, thence along line 40 to a dialyzate make-up chamber 42 wherein solids for dialyzate make-up are stored in slowly soluble form from metered addition to the dialysis fluid. The make-up solids may comprise glucose and salt as required by the dialyzate, e.g., in pelleted form and of a composition to supply the desired proportion of additives. Where a drug or other conditioning agent is being metered into the dialysis fluid for reverse transport through the dialysis membrane into the blood, the drug dissolution rate may be controlled by the use of an excipient or by having a plurality of differentially soluble timed-release capsules. A typical dialysis fluid will comprise:

| Component | g/liter |
|---|---|
| Sodium chloride | 5.8 |
| Sodium Acetate Trihydrate | 4.5 |
| Potassium Chloride | 0.155 |
| Calcium Chloride | 9.180 |
| Magnesium Chloride Hexahydrate | 0.150 |
| Glucose | 2.0 |
| Water | Balance |

In dialytic exchange, this dialysis solution will become progressively more dilute in these constituents through transport of excess water from the blood to the dialyzate as a result of the osmotic pressure differential.

The dialysis fluid emerging from the second regeneration chamber 42 is passed along line 44 back to dialytic exchange with the blood. The pump P serves to pressurize the dialytic fluid to enable adequate flow rates through the several chambers, e.g., a rate of 500 mil/min. in dialysis tubing of 0.250 inch internal diameter or less, which may be used herein.

Line 46 is teed into line 36 to enable removal of excess fluid due to water accumulation from the blood. Valve V in line 46 serves as a tap to control flow of fluid to waste receiver 20, where such fluid is accumulated in the manner of a bladder for periodic disposal at a convenient time and place. Valve V may be pressure responsive to automatically vent fluid to waste receiver 20 as dictated by pressure conditions in line 46.

Figure 2:
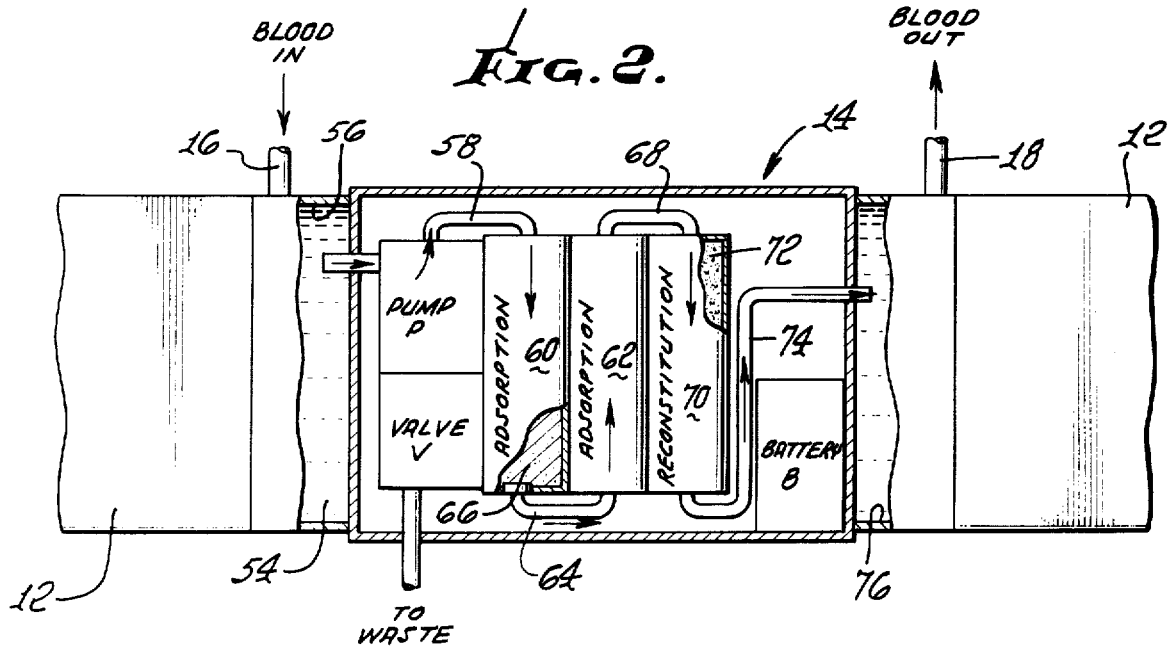
FIG. 2 is a partly schematic, sectional view of the buckle portion of the appliance and associated portions of the belt, showing in elevation the regeneration chambers housed in the buckle.

A typical arrangement of parts is shown in FIG. 2. Belt portions 12 are connected to buckle 14. The inlet-outlet terminals 16, 18 connected to catheters (not shown) pass the blood from the body into the appliance, e.g., through a manifold 48 as shown in FIG. 3. The dialysis fluid 54 pumped through the belt portions 12 suitably confined in conduit 50, FIGS. 3, 4 by pump P countercurrently to blood flow through the membrane tubing 52. Pump P draws used dialysis fluid 54 from cavity 56 and pumps this fluid through line 58 to a first regeneration chamber shown as a pair of vessels 60, 62 interconnected for series flow by line 64, and each filled with fluid passing adsorbent 66. Thus treated dialysis fluid is passed through line 68 to second regeneration chamber 70, it being loaded with pelleted dialyzate solids 72 for restoration of dialyzing concentrations of additives, thence through line 74 the regenerated dialysis fluid is passed into cavity 76 for introduction into the conduit 50.

The invention contemplates, in preferred embodiments, extended annular passageways for dialysis fluid defined by an inner tubular dialysis membrane and an outer conduit of circular, rectangular or other closed figure configuration. As shown in FIGS. 3–5, blood entering the appliance from the body is passed into dialysis membrane tubing 52 through, e.g., a manifold 48 extending through cavity 56 and returned to the body through manifold 48 in cavity 76. Dialysis fluid passes through conduit 50 enclosing the membrane tubing 52 and thereby immersing the membrane tubing in countercurrently flowing dialysis fluid. The tubing-in-conduit arrangement is supported in belt portion 12 which is normally of 20 to 50 inches in length. Where the membrane tubing 52 is relatively large, e.g., 0.250 inch in internal diameter, a single conduit 50 may be used for each individual length of such tubing, the several tubing-in-conduit structures being alined in parallel array within the belt portion 12, as shown in FIGS. 3 and 4. Alternatively the dialysis membrane tubing 52 may be relatively smaller, e.g., 0.008 inch in internal diameter, and a single conduit 50 may enclose several lengths of such tubing, see FIG. 4a.

A single continuous length of membrane tubing may be employed, the tubing being laid sinuously within the belt portion 12 to achieve the desired length of dialysis duration on each pass. As shown in FIGS. 3a and 5 for example, the membrane tubing 52 enclosed by tubular conduit 50 is reversely continuous throughout its length forming parallel extents 78 lying within belt portion 12, each jacketed by conduit 50 to carry dialysis fluid along the membrane tubing.

It may be desirable to support the membrane tubing 52 within the conduit 50 and for this purpose fluid passing spacers 80 may be provided to maintain the concentric disposition of the tubing within the conduit, as necessary against collapse of the dialysis fluid passageway 82. The spacer material may be, for example, a plastic netting.

It will be evident that the invention provides for the effective purging of unwanted matter from the blood into a dialyzate, and separation thereof from the dialyzate, but also for the replenshment of the dialyzate in a separate step whereby the dialyzing system is continually refreshed. The disclosed system thus comprises blood impurity transfer and removal, with any concomitant removal of the salt essential to maintenance of a suitable dialyzate concentration compensated for by continual, metered addition of make-up salt.

I claim:

1. In a dialyzing appliance of the type adapted to be worn about the human body for continuous use as the user goes about his daily tasks which comprises a dialyzing means including a dialysis fluid chamber and dialysis membrane defining an extended blood flow passage for blood circulation through the fluid chamber in dialyzing relation with the dialysis fluid, means to regenerate the dialysis fluid continuously during blood circulation comprising a regeneration loop having in series flow connection with the dialysis fluid chamber a first regeneration chamber containing sorbtive material adapted to remove from the dialyzing fluid impurities dialyzed thereinto from the blood, and a second regeneration chamber containing particulate make-up dialyzate solids adapted for controlled rate dissolution by dialyzing fluid passing through said second chamber for reconstituting the dialysis fluid, and means to pump the dialysis fluid continuously through the regeneration loop in solid dialyzate dissolving relation; and means to removably attach the appliance to the body of the wearer comprising a belt adapted to encircle the waist of the wearer and having a buckle portion for securing the belt in position; said pump means including an electrically operated motor carried by the belt and buckle to drive the pump.

2. Dialyzing appliance according to claim 1 including also a fluid tap arranged to drain fluid from the regeneration loop to a waste receiver.

3. Dialyzing appliance according to claim 2 in which said fluid tap includes valve means for controlling communication between the loop and said waste receiver responsive to fluid pressure in the loop.

4. Dialyzing appliance according to claim 1 in which the dialysis fluid is carried in longitudinally extended conduit and said dialysis membrane comprises plural lengths of tubing in flow connected relation and immersed throughout their length in conduit dialysis fluid.

5. Dialysis appliance according to claim 4 in which a plurality of dialysis membrane tubing lengths are enclosed by a single dialysis fluid conduit.

6. Dialysis appliance according to claim 4 in which the dialysis membrane tubing and the dialysis fluid conduit are concentrically disposed and including also fluid passing support structure extending between the tubing and tube to maintain their concentric disposition along their length.

7. Dialyzing appliance according to claim 4 in which said dialysis membrane tubing comprises a plurality of individual lengths extended in parallel array immersed in dialysis fluid, and including also manifold means arranged to deliver blood to the individual lengths of dialysis membrane tubing, and said buckle portion houses said first and second regeneration chambers and said pump means.

8. Dialysis appliance according to claim 4 in which said dialysis membrane tubing comprises reversely continuous and parallel extents jacketed in dialysis fluid conduit and including also means connecting the terminals of the tubing to the wearer for blood circulation through the tubing oppositely to the dialysis fluid flow in the conduit.

9. In a dialyzing appliance of the type adapted to be worn about the human body for continuous use as the user goes about his daily tasks, which comprises a dialyzing means including a dialysis fluid chamber and dialysis membrane defining an extended blood flow passage for blood circulation through the fluid chamber in dialyzing relation with the dialysis fluid, means to regenerate the dialysis fluid continuously during blood circulation comprising a regeneration loop having in series flow connection with the dialysis fluid chamber a first regeneration chamber containing an absorbent bed of sorptive material adapted to remove by adsorption from the dialyzing fluid impurities dialyzed thereinto from the blood, and a second regeneration chamber containing slowly soluble pelleted make-up dialyzate solids for reconstituting the dialysis fluid, and means to pump the dialysis fluid continuously through the regeneration loop for sorption removal of blood impurities and solubilizing addition of make-up dialyzate solids; and means to removably attach the appliance to the body of the wearer; said dialysis membrane comprising plural lengths of tubing in flow connected relation concentrically disposed wtihin a conduit carrying dialysis fluid, and fluid passing structure extending between the tubing and the conduit to maintain said disposition.

* * * * *